United States Patent
Melese et al.

(10) Patent No.: US 12,334,991 B2
(45) Date of Patent: Jun. 17, 2025

(54) METHODS, APPARATUSES AND COMPUTER-READABLE MEDIUMS TO LOCATE PASSIVE INTERMODULATION

(71) Applicant: Nokia Solutions and Networks Oy, Espoo (FI)

(72) Inventors: Yared Melese, Coppell, TX (US); Shahriar Shahabuddin, Coppell, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/733,376

(22) Filed: Jun. 4, 2024

(65) Prior Publication Data

US 2025/0062840 A1  Feb. 20, 2025

(30) Foreign Application Priority Data

Aug. 16, 2023  (FI) .................... 20235917

(51) Int. Cl.
| | |
|---|---|
| *H04B 1/38* | (2015.01) |
| *H04B 17/20* | (2015.01) |
| *H04B 17/364* | (2015.01) |
| *H04L 5/16* | (2006.01) |

(52) U.S. Cl.
CPC ......... *H04B 17/204* (2023.05); *H04B 17/364* (2015.01)

(58) Field of Classification Search
CPC .......................... H04B 17/204; H04B 17/364; H04B 17/0085; G01S 13/08
USPC ................ 375/227, 219, 220, 229, 350, 346
See application file for complete search history.

(56) References Cited

U.S. PATENT DOCUMENTS

| | | | |
|---|---|---|---|
| 8,666,322 B1 | 3/2014 | Bradley et al. | |
| 2017/0343660 A1* | 11/2017 | Wang | ...................... G01S 13/08 |
| 2018/0081047 A1* | 3/2018 | Gander | .............. H04B 17/0085 |

(Continued)

FOREIGN PATENT DOCUMENTS

| | | |
|---|---|---|
| EP | 3318885 A1 | 5/2018 |
| EP | 4191901 A1 | 6/2023 |
| WO | 2014/012585 A1 | 1/2014 |

(Continued)

OTHER PUBLICATIONS

Kearney et al., "Passive Intermodulation (PIM) Effects in Base Stations: Understanding the Challenges and Solutions", Analog Dialogue, vol. 51, Mar. 2017, pp. 1-5.

(Continued)

*Primary Examiner* — Phuong Phu
(74) *Attorney, Agent, or Firm* — Nokia Technologies Oy (57) ABSTRACT

A radio access network element, such as a remote radio head (RRH) comprises at least one processor and at least one memory. The at least one memory stores instructions that, when executed by the at least one processor, cause the radio access network element to: compute a communication delay between the radio access network element and a source of passive intermodulation, based on receiver group delay information for the radio access network element in the bandwidth of the passive intermodulation; and determine a distance between the source of passive intermodulation and the radio access network element based on the communication delay.

18 Claims, 8 Drawing Sheets

(56) References Cited

U.S. PATENT DOCUMENTS

2018/0219636 A1    8/2018  Gale et al.
2021/0099239 A1    4/2021  Vella-Coleiro et al.

FOREIGN PATENT DOCUMENTS

WO    2019/245598 A1    12/2019
WO    2020/161524 A1    8/2020
WO    2020/181320 A1    9/2020
WO    2023/082088 A1    5/2023

OTHER PUBLICATIONS

Office action received for corresponding Finnish Patent Application No. 20235917, dated Jan. 12, 2024, 6 pages.
Extended European Search Report received for corresponding European Patent Application No. 24174319.4, dated Oct. 28, 2024, 9 pages.

* cited by examiner

METHODS, APPARATUSES AND COMPUTER-READABLE MEDIUMS TO LOCATE PASSIVE INTERMODULATION

RELATED APPLICATION

This application claims benefit of priority from Finnish Patent App. No. 20235917, filed Aug. 16, 2023, the disclosure of which is hereby incorporated in its entirety by reference herein.

TECHNICAL FIELD

One or more example embodiments relate to locating passive intermodulation (PIM) in wireless communications networks.

BACKGROUND

Passive intermodulation (PIM) occurs when passive devices such as cables or antennas transmit signals, resulting in interference with a receiver. PIM can be divided into two categories: line PIM and over-the-air (or air) PIM. In line PIM, PIM sources are contained within the electronic device (e.g., a remote radio head (RRH)), cables, antennas, etc. Over-the-air PIM, however, occurs when PIM sources are situated beyond these components, including external factors such as rusty bolts on towers, old TV antennas, air conditioner units, etc. PIM may arise from flaws in manufacturing or workmanship, such as loose cable connectors, dissimilar metal joints, corrosion of cables, etc.

SUMMARY

Interference resulting from passive intermodulation (PIM) may be detrimental to receiver sensitivity, which may result in communication disruptions. Conventionally, PIM is avoided via frequency planning. However, such conventional methods may not be feasible due to multiband and antenna sharing schemes.

One or more example embodiments provide mechanisms for locating PIM affecting an electronic device (e.g., a remote radio head (RRH) or other radio access network (RAN) element) by, for example, measuring distance-to-PIM.

Generally, according to one or more example embodiments, when PIM generating carriers are commissioned by a network operator, a PIMC computational engine calculates an intermodulation products model that exists in the receive (RX) band. One or more delays are then calculated (e.g., by a correlator) from the intermodulation products model and the RX signal, and the distance-to-PIM is determined based on the calculated one or more delays. At least one example embodiment provides a radio access network element (e.g., a remote radio head (RRH)) comprising at least one processor and at least one memory. The at least one memory stores instructions that, when executed by the at least one processor, cause the radio access network element to: compute a communication delay between the radio access network element and a source of passive intermodulation, based on receiver group delay information for the radio access network element in the bandwidth of the passive intermodulation; and determine a distance between the source of passive intermodulation and the radio access network element based on the communication delay.

At least one example embodiment provides a radio access network element (e.g., a remote radio head (RRH)) comprising: means for computing a communication delay between the radio access network element and a source of passive intermodulation, based on receiver group delay information for the radio access network element in the bandwidth of the passive intermodulation; and means for determining a distance between the source of passive intermodulation and the radio access network element based on the communication delay.

According to one or more example embodiments, the communication delay may be an average receiver group delay in the bandwidth of the passive intermodulation. The distance may be a distance from an antenna connector at the radio access network element to the source of passive intermodulation.

The at least one memory may store instructions that, when executed by the at least one processor, cause the radio access network element to: determine whether a portion of the passive intermodulation is outside a receive band at the radio access network element; and compute the average receiver group delay for the passive intermodulation within the receive band and the passive intermodulation within a threshold bandwidth outside the receive band. The threshold bandwidth may be about 2 MHz.

The at least one memory may store instructions that, when executed by the at least one processor, cause the radio access network element to: obtain cancelation delay based on a delay search signal transmitted by the radio access network element; and compute the communication delay based on the average receiver group delay and cancelation delay.

The receiver group delay information may include duplexer group delay for the radio access network element.

The at least one memory may store instructions that, when executed by the at least one processor, cause the radio access network element to: determine a receiver group delay inverse model based on the receiver group delay information; obtain an equalized signal by applying the receiver group delay inverse model to a signal received at the radio access network element; and compute the communication delay based on the equalized signal and the receiver group delay information.

The at least one memory may store instructions that, when executed by the at least one processor, cause the radio access network element to: obtain a cancelation delay at the radio access network element based on the equalized signal; and compute the communication delay based on the cancelation delay and the receiver group delay information.

The at least one memory may store instructions that, when executed by the at least one processor, cause the radio access network element to perform a delay search based on the equalized signal to obtain the cancelation delay.

The receiver group delay information may be a fixed receiver group delay measured at the radio access network element.

The at least one memory may store instructions that, when executed by the at least one processor, cause the radio access network element to: determine a receiver group delay model based on the receiver group delay information; obtain a compensated delay search basis function by applying the receiver group delay model to a delay search basis function for a transmitted signal resulting in the passive intermodulation; and compute the communication delay based on the compensated delay search basis function and the receiver group delay information.

The at least one memory may store instructions that, when executed by the at least one processor, cause the radio access network element to: obtain a cancelation delay at the radio access network element based on the compensated delay search basis function; and compute the communication delay based on the cancelation delay and the receiver group delay information.

The receiver group delay information may be a fixed receiver group delay measured at the radio access network element.

The communication delay may be a combination of an over-the-air delay associated with the passive intermodulation and a cable transmission delay associated with the passive intermodulation, and the at least one memory may store instructions that, when executed by the at least one processor, cause the radio access network element to: compute the cable transmission delay; compute the over-the air delay based on the communication delay and the cable transmission delay; and determine an over-the-air distance between the source of passive intermodulation and the radio access network element based on the over-the-air delay.

The radio access network element may further include a plurality of antennas, and the at least one memory may store instructions that, when executed by the at least one processor, cause the radio access network element to: iterate a delay search for transmissions from each of the plurality of antennas to determine a maximum delay search magnitude; obtain a cancelation delay at the radio access network element based on the maximum delay search magnitude; and compute the communication delay based on the cancelation delay and the receiver group delay information.

At least one other example embodiment provides a method for locating a source of passive intermodulation at a radio access network element, the method comprising: computing a communication delay between the radio access network element and the source of passive intermodulation, based on receiver group delay information for the radio access network element in the bandwidth of the passive intermodulation; and determining a distance between the source of passive intermodulation and the radio access network element based on the communication delay.

At least one other example embodiment provides a non-transitory computer-readable storage medium storing instructions that, when executed by at least one processor at a radio access network element, cause the radio access network element to perform a method for locating a source of passive intermodulation at the radio access network element, the method comprising: computing a communication delay between the radio access network element and the source of passive intermodulation, based on receiver group delay information for the radio access network element in the bandwidth of the passive intermodulation; and determining a distance between the source of passive intermodulation and the radio access network element based on the communication delay.

The communication delay may be a combination of an over-the-air delay associated with the passive intermodulation and a cable transmission delay associated with the passive intermodulation, and the method may further include: computing the cable transmission delay; computing the over-the air delay based on the communication delay and the cable transmission delay; and determining an over-the-air distance between the source of passive intermodulation and the radio access network element based on the over-the-air delay.

The radio access network element may include a plurality of antennas, and the method may further include: iterating a delay search for transmissions from each of the plurality of antennas to determine a maximum delay search magnitude; obtaining a cancelation delay at the radio access network element based on the maximum delay search magnitude; and computing the communication delay based on the cancelation delay and the receiver group delay information.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

It will be appreciated that a number of example embodiments described herein may be used in combination.

Although specific example embodiments may be discussed herein with regard to remote radio heads (RRHs), example embodiments should not be limited to this example. Rather, example embodiments may be applicable to other electronic devices, such as gNBs, base stations, access points, enhanced NodeBs (eNodeBs), other radio access network elements, radio network elements, or network nodes.

While one or more example embodiments may be described with regard to an electronic device or radio access network (RAN) element, such as a RRH, it should be understood that one or more example embodiments discussed herein may be applicable to and/or performed by one or more processors (or processing circuitry) at the applicable device. For example, according to one or more example embodiments, at least one memory may include or store computer-executable instructions that, when executed by at least one processor, cause the electronic device to perform one or more operations discussed herein.

As discussed herein, the terminology "one or more" and "at least one" may be used interchangeably.

As mentioned above, PIM occurs when passive devices such as cables or antennas transmit two or more signals, resulting in interference. This interference may be detrimental to receiver sensitivity, which may result in communication disruptions. In some instances, PIM requires troubleshooting by a network operator. However, network operators face a relatively challenging task in troubleshooting PIM when detected at least partly because most PIM detection solutions do not provide the precise location of the PIM source.

One or more example embodiments provide mechanisms to more accurately identify the location of a source of PIM along a transmission/reception path. The location may be in the form of a distance (e.g., from the RRH, an antenna connector or other element/component at an RRH), which is referred to as distance-to-PIM. More accurate distance-to-PIM may at least improve troubleshooting cases in which the PIM source is relatively far away from the radio transmitter. By utilizing a distance-to-PIM technique according to one or more example embodiments, network operators may detect, locate and troubleshoot PIM issues remotely without the need to physically visit the site. This may decrease (e.g., substantially decrease) debugging time and costs associated therewith.

In more specific cases, distance-to-PIM may be used to determine whether a PIM source is located within a RAN element, such as a RRH, a cable, or one or more antennas. If the distance-to-PIM indicates that the PIM source is outside the RRH, for example, one may conclude that the RRH itself is not malfunctioning, and the network operator must fix an external setup issue. Additionally, PIM cancellation may deteriorate over time, even in a functioning product, due to the interference from PIM. Consequently, mechanisms that assist in locating a PIM source may be useful for long-term troubleshooting.

According to one or more example embodiments, distance-to-PIM may be determined using, for example, a PIM computational engine, all available delays, and a receiver (RX) group delay at the RRH. The RRH PIM computational engine may be executed by at least one processor or other processing circuitry internal to the RRH, such that the distance-to-PIM may be determined within (e.g., entirely within or internal to) the RRH.

As will be discussed in more detail below, embodiments of methods for determining distance-to-PIM may characterized as (i) a method for determining distance-to-PIM with an average group delay compensated RX; (ii) a method for determining distance-to-PIM with an inverse group delay compensated RX; (iii) a method for determining distance-to-PIM with a group delay compensated basis function; and (iv) a method for determining over-the-air (OTA) distance-to-PIM with a group delay compensated basis function.

According to one or more example embodiments, a RRH may compute PIM source delay (also referred to as PIM source delay information or a communication delay) between the RRH and a source of PIM (also referred to as a PIM source), and then determine a distance between the source of PIM and the RRH based on the communication delay.

Figure 1:
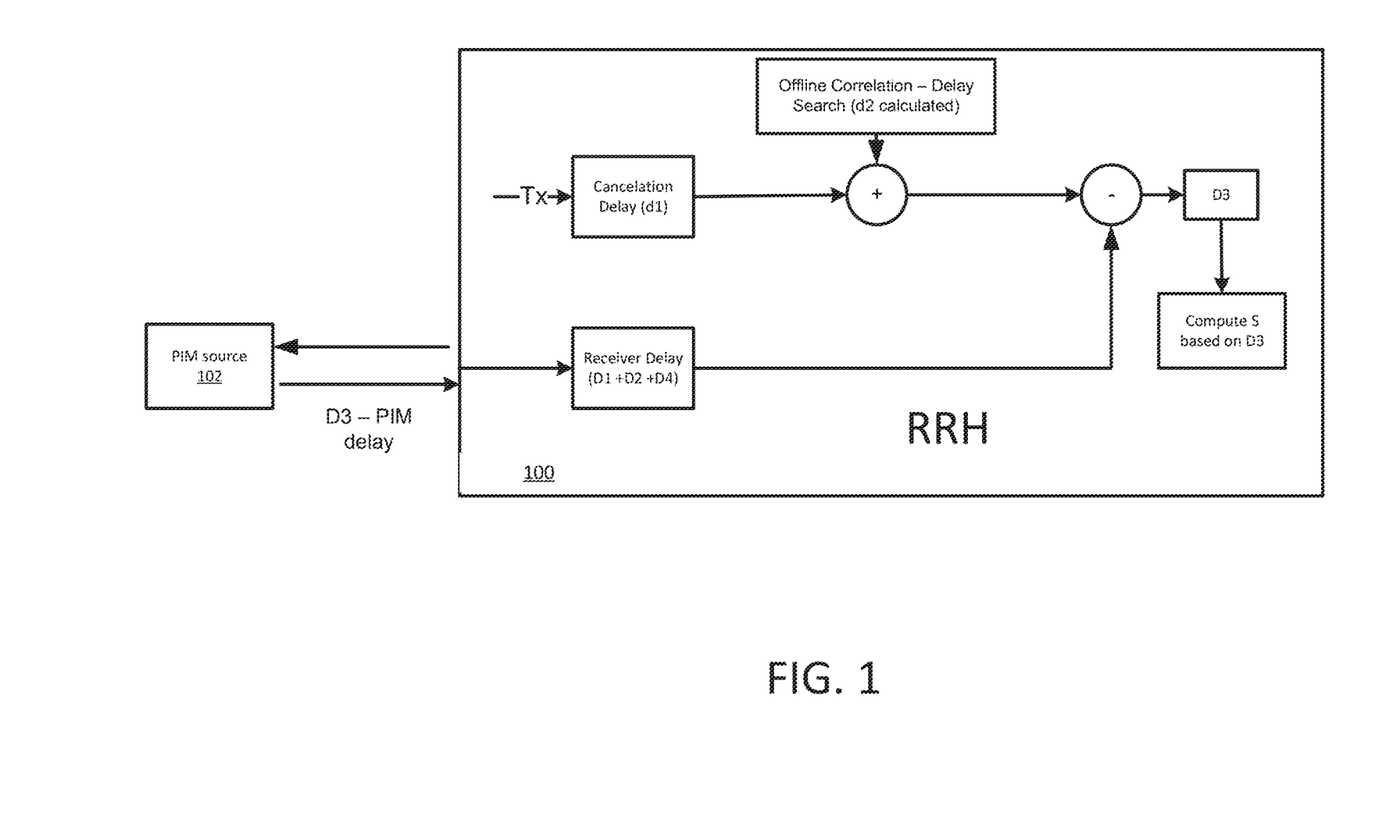
FIG. 1 is a high-level functional block diagram illustrating a remote radio head (RRH) and passive intermodulation (PIM) source according to example embodiments.

FIG. 1 is a high-level functional block diagram illustrating a RRH and a PIM source for explaining a method for computing a distance-to-PIM from (e.g., an antenna connector at) the RRH to the PIM source, according to example embodiments. More specific embodiments of this methodology will be discussed later with regard to FIGS. 2-6.

Referring to FIG. 1, the RRH 100 combines a first cancelation delay d1, which excludes transmission (TX) delay and pre nonlinear engine (pre NL) delay, with a second cancelation delay d2 calculated by the correlator (not shown) according to a delay search. A RX delay at the RRH 100 is then subtracted from the combined cancelation delay (d1+d2) to obtain the PIM source delay D3 between the PIM source 102 and the RRH 100. In this example, the RX delay is a combination or sum of the fixed, configurable delay in the RX delay register (sometimes referred to as the RX delay or RX delay block D1) at the RRH 100, unconfigurable RX delay(s) in the processing circuitry (e.g., the Field Programmable Gate Array (FPGA)) at the RRH 100 (sometimes referred to as the RX FPGA delay D2), and the RX group delay D4 (also referred to herein as RX group delay information). In this example, the RX group delay includes the RX lineup group delay and the duplexer group delay at the RRH 100.

By aligning all delays in the cancelation path (d1, d2) and RX paths (D1, D2, D3, D4) at the RRH 100 (i.e., d1+d2=D1+D2+D3+D4), the RRH 100 may compute the PIM source delay D3 according to Equation (1) shown below.

$$D3 = d1 + d2 - D1 - D2 - D4 \quad (1)$$

Once having obtained the PIM source delay D3, the RRH 100 computes the distance-to-PIM S based on the PIM source delay D3. More specifically, for example, the RRH 100 may compute the distance-to-PIM for an antenna cable, for example, according to Equation (2) shown below.

$$S = \frac{V \times D3}{2} \quad (2)$$

In Equation (2), V is given by V=v×c, where c is the speed of light and v is the velocity factor of the antenna cable, which is known a priori at the RRH 100.

Once having determined the distance-to-PIM, network (e.g., base station) operators may troubleshoot and/or track system degradation over time to potentially recognize issues in advance. This may enable replacement of weak points during scheduled maintenance, thus avoiding costly system downtime and dedicated repair efforts.

In an example embodiment, referred to as a method for determining distance-to-PIM utilizing an average group delay compensated RX, a correlator calculated cancelation delay, other system delays, and measured RX group delay information is utilized to more accurately estimate and/or predict the distance-to-PIM.

In this example embodiment, for the RX group delay, when the PIM product is within the RX band, the RRH 100 computes an average RX group delay within the bandwidth (BW) of the intermodulation. However, when a portion of the PIM product is outside the RX band, an average RX group delay is taken with the portion of the BW of the intermodulation inside the RX band and a maximum of 2 MHz (threshold BW) outside the RX band. In one example, the BW outside the RX band may be about 2 MHz. The RRH 100 then computes the distance-to-PIM based on the computed average RX group delay. This method will be discussed in more detail with regard to FIG. 2.

Figure 2:
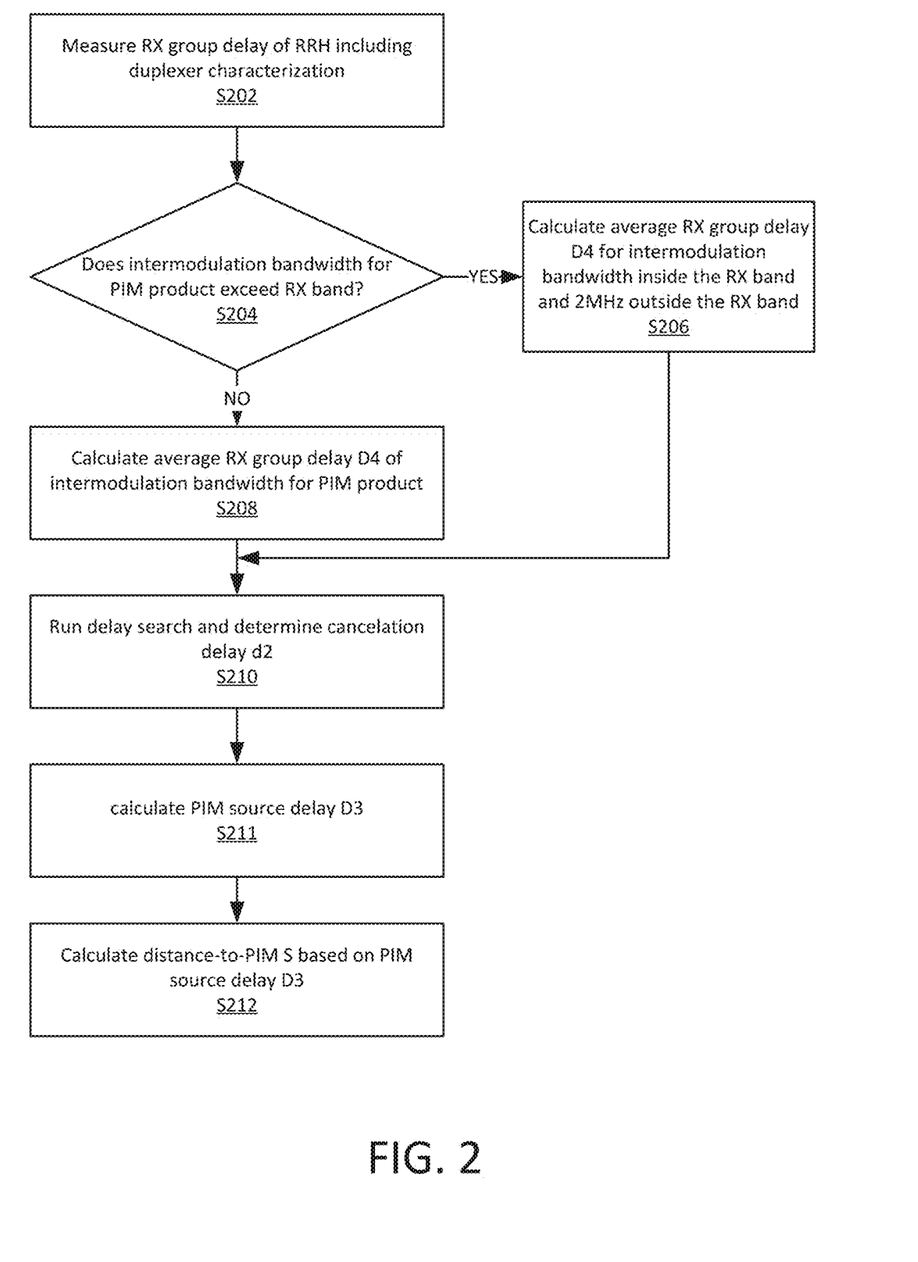
FIG. 2 is a flow chart illustrating a method according to example embodiments.

FIG. 2 is a flow chart illustrating a method for determining distance-to-PIM utilizing an average group delay compensated RX, according to example embodiments. For example purposes, the example embodiment shown in FIG. 2 will be discussed with regard to the RRH 100 described with regard to FIG. 1 and later with regard to FIG. 7. However, example embodiments should not be limited to this example.

Figure 8:
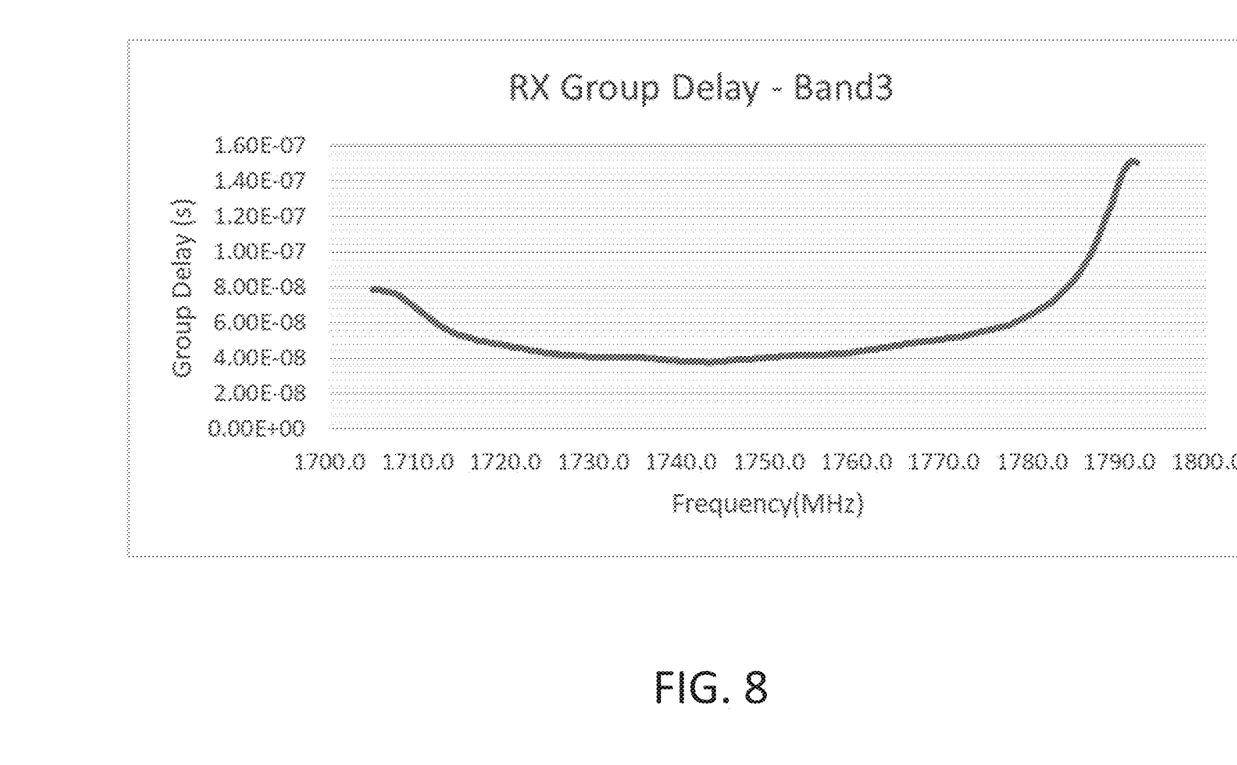
FIG. 8 is a graph illustrating an example measured receiver group delay for an uplink frequency band.

Referring to FIG. 2, at S202, the RRH 100 measures the RX group delay for the RRH. As noted above, the RX group delay includes the RX line-up group delay and the duplexer group delay at the RRH 100. FIG. 8 is a graph illustrating an example measured RX group delay for uplink frequency RX band n3 (1710 MHz-1785 MHz) at a RRH. Because methods for measuring RX group delay are generally known, a detailed discussion is omitted.

At S204, the RRH 100 determines whether the PIM bandwidth exceeds the RX band based on the measured RX group delay. That is, for example, the RRH 100 determines whether a portion of the PIM product is outside the RX band. Because methods for determining whether a portion of the PIM product is outside the RX band are known, a detailed discussion is omitted.

If the RRH 100 determines that the PIM product is entirely within the RX band at S204, then at S208 the RRH 100 calculates the RX group delay D4 as the average RX group delay of the intermodulation bandwidth for the PIM product. For example, referring to the example shown in FIG. 8, for uplink frequency RX band n3 [1710 MHz-1785 MHIz], if the intermodulation band for the PIM product is [1730, 1745], then the RRH 100 computes the average RX group delay for the intermodulation band [1730, 1745].

At S210, the RRH 100 runs a delay search to determine, via a correlator (not shown), the second cancelation delay d2. Methods for delay search and determining cancelation delay d2, such as that performed at S210, are known, and thus, a detailed discussion is omitted.

At S211, the RRH 100 computes the PIM source delay D3 based on the average RX group delay D4, the first cancelation delay d1, the second cancelation delay d2, RX delay D1 and RX FPGA delay D2 according to Equation 1 (D3=d1+d2−D1−D2−D4) discussed above. In this example, the first cancelation delay d1, the RX delay D1 and the RX FPGA delay D2 are known a priori at the RRH 100.

Once having computed the PIM source delay D3, at S212 the RRH 100 computes the distance-to-PIM S according to Equation 2 discussed above.

Returning to S204, if the RRH 100 determines that at least a portion of the PIM product is outside the RX band, then at S206 the RRH 100 calculates the RX group delay D4 as an average RX group delay across the portion of the intermodulation band for the PIM product inside the RX band and the portion of the intermodulation band for the PIM product outside the RX band up to about 2 MHz (threshold BW). In other words, the RRH 100 computes the RX group delay as the average RX group delay for the portion of the intermodulation band failing inside the receive band and the portion of the intermodulation band that is within a threshold bandwidth (e.g., 2 MHz) outside the receive band. For example, referring back to the example shown in FIG. 8, for uplink frequency RX band n3 [1710 MHz-1785 MHz], if the intermodulation band for the PIM product is [1777.4 MHz, 1792.9 MHz], then about 50% of the intermodulation energy falls inside the RX band. In this case, the RRH 100 computes the average RX group delay for the band [1775 MHz, 1787 MHz]; that is, the portion of the intermodulation band for the PIM product inside the RX band ([1775 MHz, 1785 MHz]) and the portion of the intermodulation band for the PIM product outside the RX band up to about 2 MHz ([1785 MHz, 1787 MHz]).

Once having computed the RX group delay D4 as an average RX group delay at S206, the process proceeds to S210 and continues as discussed herein.

Although not shown in FIG. 2, a network operator may then utilize this distance-to-PIM S to, for example, identify the location of the PIM source (e.g., inside or outside the RRH) and/or for troubleshooting PIM at the RRH 100.

In another example embodiment, referred to as a method for determining distance-to-PIM with an inverse group delay compensated RX, the RRH utilizes the delay search transmitted (TX) signal, RX signal and inverse RX group delay model to obtain various delays and then compute the distance-to-PIM. This example embodiment will be discussed in more detail below with regard to FIG. 3.

Figure 3:
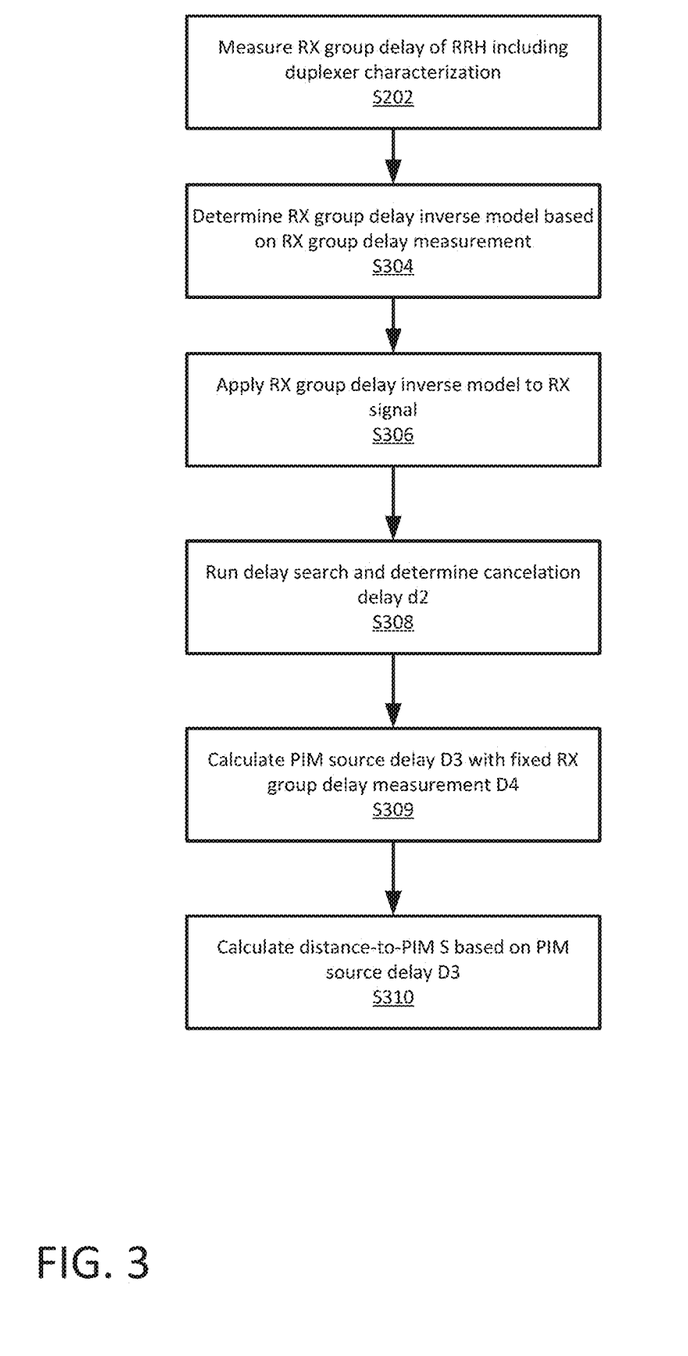
FIG. 3 is a flow chart illustrating another method according to example embodiments.

FIG. 3 is a flow chart illustrating a method for determining distance-to-PIM utilizing an inverse delay compensated receiver (RX), according to example embodiments. As with FIG. 2, for example purposes, FIG. 3 will be discussed with regard to the RRH 100 described with regard to FIG. 1 and later with regard to FIG. 7. However, example embodiments should not be limited to this example.

Referring to FIG. 3, at S202, the RRH 100 measures the RX group delay for the RRH 100 as discussed above with regard to FIG. 2. As noted above, the RX group delay includes the RX line-up group delay and the duplexer group delay at the RRH 100.

At S304, the RRH 100 determines a RX group delay inverse model based on the RX group delay measured at S202. In this case, the delay search TX signal x1 is the signal that results in the PIM product at the RX. In this case, the delay search basis function model is given by Equation 3 shown below.

$$\text{model} = x1 * x1 * conj(x1) \tag{3}$$

In Equation 3, conj(x1) refers to the complex conjugate of the delay search TX signal x1.

The RRH 100 may generate the RX group delay inverse model $f_{inv}$ from an RX line-up S2P file (e.g., 61 tap equalizer filter).

At S306, the RRH 100 applies the RX group delay inverse model $f_{inv}$ to the RX signal RX to obtain an equalized RX signal $RX_{eq}$. In one example, the RRH 100 convolves the RX group delay inverse model $f_{inv}$ with the RX signal RX to obtain the equalized RX signal $RX_{eq}$ as shown below in Equation 4.

$$RX_{eq} = RX \circledast f_{inv} \quad (4)$$

At S308, the RRH 100 runs a delay search and determines the second cancelation delay d2 based on the equalized RX signal $RX_{eq}$ and a decimated delay search basis function $model_{dec}$ for the delay search. The decimated delay search basis function $model_{dec}$ is the delay search basis function model (given by Equation 3) decimated based on a sampling frequency difference between the delay search basis function model and the RX signal RX.

In one example, at S308, the RRH 100 determines the peak of the delay search as the index of the maximum correlation between the equalized RX signal $RX_{eq}$ and the decimated delay search basis function $model_{dec}$ as shown below in Equation 5.

$$d2(\text{samples}) = maxindex(\text{corr}(RX_{eq}, model_{dec})) \quad (5)$$

The second cancelation delay d2(s) is then obtained based on the peak of the delay search d2(samples) and the delay search basis function sampling frequency $f_s$ as shown below in Equation 6.

$$d2(s) = \frac{d2(\text{samples})}{f_s} \quad (6)$$

According to one or more example embodiments, the RRH 100 may generate the decimated delay search basis function $model_{dec}$ based on (e.g., by decimating) a filtered delay search basis function $model_{flt}$ as shown below in Equation 7.

$$model_{sec} = \text{decimate}(model_{flt}) \quad (7)$$

The RRH 100 may generate the filtered search delay basis function $model_{flt}$ based on (e.g., by convolving) the delay search basis function model with decimation filter coefficients $f_{dec}$ as shown below in Equation 8. The decimation filter coefficients $f_{dec}$ may be obtained/designed in any known manner.

$$model_{flt} = model \circledast f_{dec} \quad (8)$$

Still referring to FIG. 3, once having obtained the second cancelation delay d2, at S309 the RRH 100 computes the PIM source delay D3 based on the RX group delay D4, the first cancelation delay d1, the second cancelation delay d2, RX delay D1 and the RX FPGA delay D2 according to Equation 1 discussed above. In this example, the first cancelation delay d1, the RX delay D1, and the RX FPGA delay D2 are known a priori at the RRH 100, and the RX group delay D4 may be determined and optimized based on the measured data average at the mid band of the RX group delay measured at S202.

Once having computed the PIM source delay D3, at S310 the RRH 100 computes the distance-to-PIM S according to Equation 2 discussed above.

Although not shown in FIG. 3, a network operator may then utilize this distance-to-PIM S to, for example, identify the location of the PIM source (e.g., inside or outside the RRH) and/or for troubleshooting PIM at the RRH 100.

In another example embodiment, referred to as a method for determining distance-to-PIM with a group delay compensated basis function, the RRH 100 utilizes the delay search TX signal, the RX signal and a generated RX group delay compensated basis function to derive a more accurate distance-to-PIM. This example embodiment will be discussed in more detail below with regard to FIG. 4.

Figure 4:
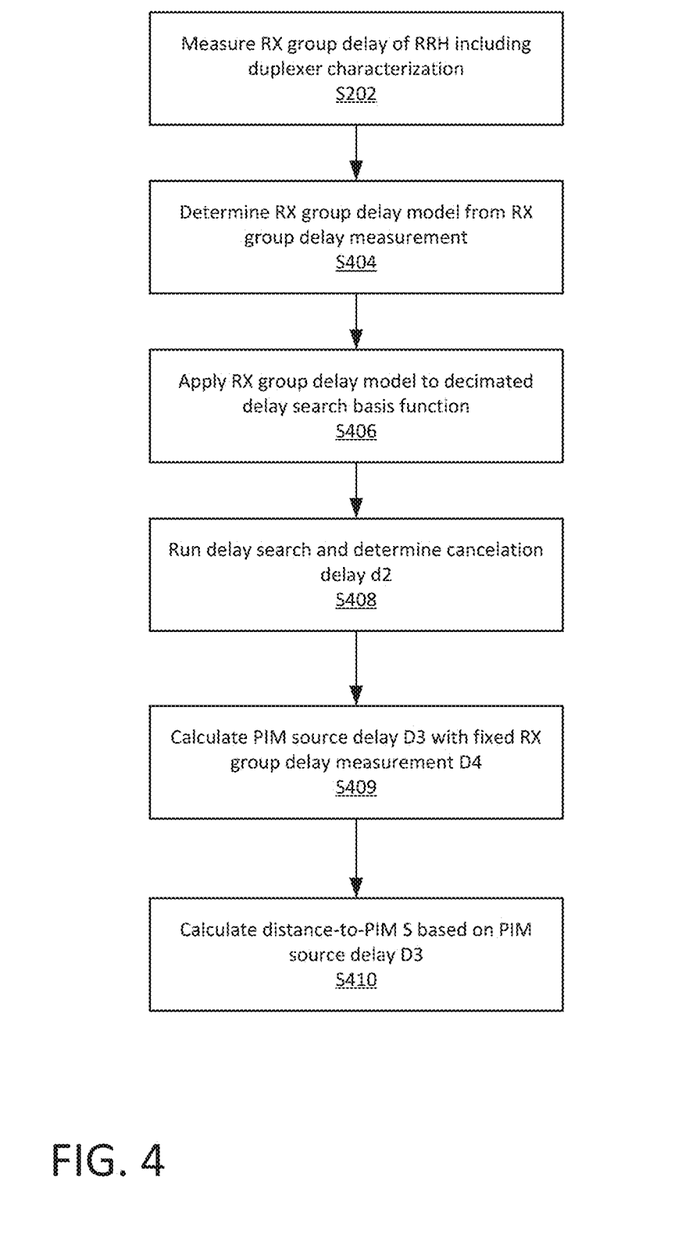
FIG. 4 is a flow chart illustrating yet another method according to example embodiments.

FIG. 4 is a flow chart illustrating a method for determining distance-to-PIM utilizing a group delay compensated basis function, according to example embodiments. As with FIGS. 2 and 3, for example purposes, FIG. 4 will be discussed with regard to the RRH 100 described with regard to FIG. 1 and later with regard to FIG. 7. However, example embodiments should not be limited to this example.

As with the example embodiment shown in FIG. 3, in this example the delay search TX signal x1 is the signal that results in the PIM product, and the delay search basis function model is given by Equation 3 discussed above.

Referring to FIG. 4, at S202, the RRH 100 measures the RX group delay for the RRH 100 as discussed above with regard to FIG. 2. As noted above, the RX group delay includes the RX line-up group delay and the duplexer group delay at the RRH 100.

At S404, the RRH 100 determines a RX group delay model (RX direct model) $f_{model}$ based on the RX group delay measured at S202. The RX group delay model $f_{model}$ may be in the form of model coefficients generated from the RX lineup S2P file.

At S406, the RRH 100 applies the RX group delay model $f_{model}$ to a decimated delay search basis function $model_{dec}$ to obtain a compensated delay search basis function $model_{comp}$. In one example, the RRH 100 convolves the RX group delay model $f_{model}$ with the decimated delay search basis function $model_{dec}$ to obtain the compensated delay search basis function model $model_{comp}$ as shown below in Equation (9).

$$model_{camp} = model_{dec} \circledast f_{model} \quad (9)$$

The decimated delay search basis function $model_{dec}$ is the delay search basis function model decimated based on a sampling frequency difference between the delay search basis function model and the RX signal RX, and may be obtained based on a filtered search delay basis function $model_{flt}$ in the same or substantially the same manner as discussed above with regard to FIG. 3. The RRH 100 may generate the filtered search delay basis function $model_{flt}$ based on (e.g., by convolving) the delay search basis function model and decimation filter coefficients $f_{dec}$ in the same or substantially the same manner as discussed above with regard to FIG. 3.

Still referring to FIG. 4, at S408, the RRH 100 runs a delay search and determines the second cancelation delay d2 based on the compensated delay search basis function $model_{comp}$ and the RX signal RX corresponding to the delay search TX signal. In one example, the RRH 100 determines the peak of the delay search as the index of the maximum correlation between the RX signal RX and the compensated delay search basis function model$_{comp}$ as shown below in Equation 10.

$$d2(\text{samples}) = maxindex(\text{corr}(RX, \text{model}_{comp})) \quad (10)$$

The second cancelation delay d2 (also referred to as d2(s) here and in other example embodiments discussed below) is then obtained based on the peak of the delay search d2(samples) and the model sampling frequency $f_s$ according to, for example, Equation 6 discussed above.

Once having obtained the second cancelation delay d2, at S409 the RRH 100 computes the PIM source delay D3 based on the RX group delay D4, the first cancelation delay d1, the second cancelation delay d2, the RX delay D1 and the RX FPGA delay D2 according to Equation 1 discussed above. As with the example embodiment shown in FIG. 3, the first cancelation delay d1, the RX delay D1, and the RX FPGA delay D2 are known a priori at the RRH 100, and the RX group delay D4 may be determined and optimized based on the measured data average at the mid band of the RX group delay measured at S202.

Once having computed the PIM source delay D3, at S410 the RRH 100 computes the distance-to-PIM S according to Equation 2 discussed above.

Although not shown in FIG. 4, a network operator may then utilize this distance-to-PIM S to, for example, identify the location of the PIM source (e.g., inside or outside the RRH) and/or for troubleshooting PIM at the RRH 100.

In another example embodiment, referred to as a method for determining over-the-air (OTA) distance-to-PIM utilizing a RX group delay compensated basis function, the RRH correlates transmissions from all antennas with the RX signal RX and identifies the antenna with the maximum correlation to utilize in calculating the distance-to-PIM over-the-air (OTA distance-to-PIM). These distances may be saved for future use by network operators in, for example, debugging. This example embodiment will be discussed in more detail below with regard to FIGS. 5 and 6.

Figure 5:
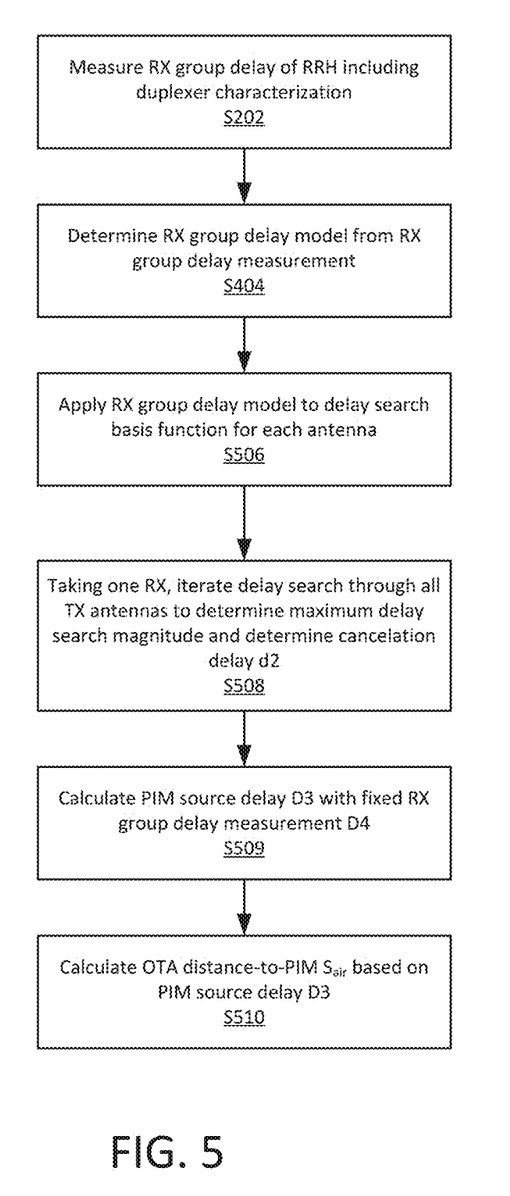
FIG. 5 is a flow chart illustrating another method according to example embodiments.

FIG. 5 is a flow chart illustrating a method for determining an over-the-air (OTA) distance-to-PIM utilizing a RX group delay compensated basis function, according to example embodiments.

The example embodiment shown in FIG. 5 will be discussed with the regard to FIG. 6, which illustrates an example scenario including a RRH 600 and a PIM source 602.

Figure 6:
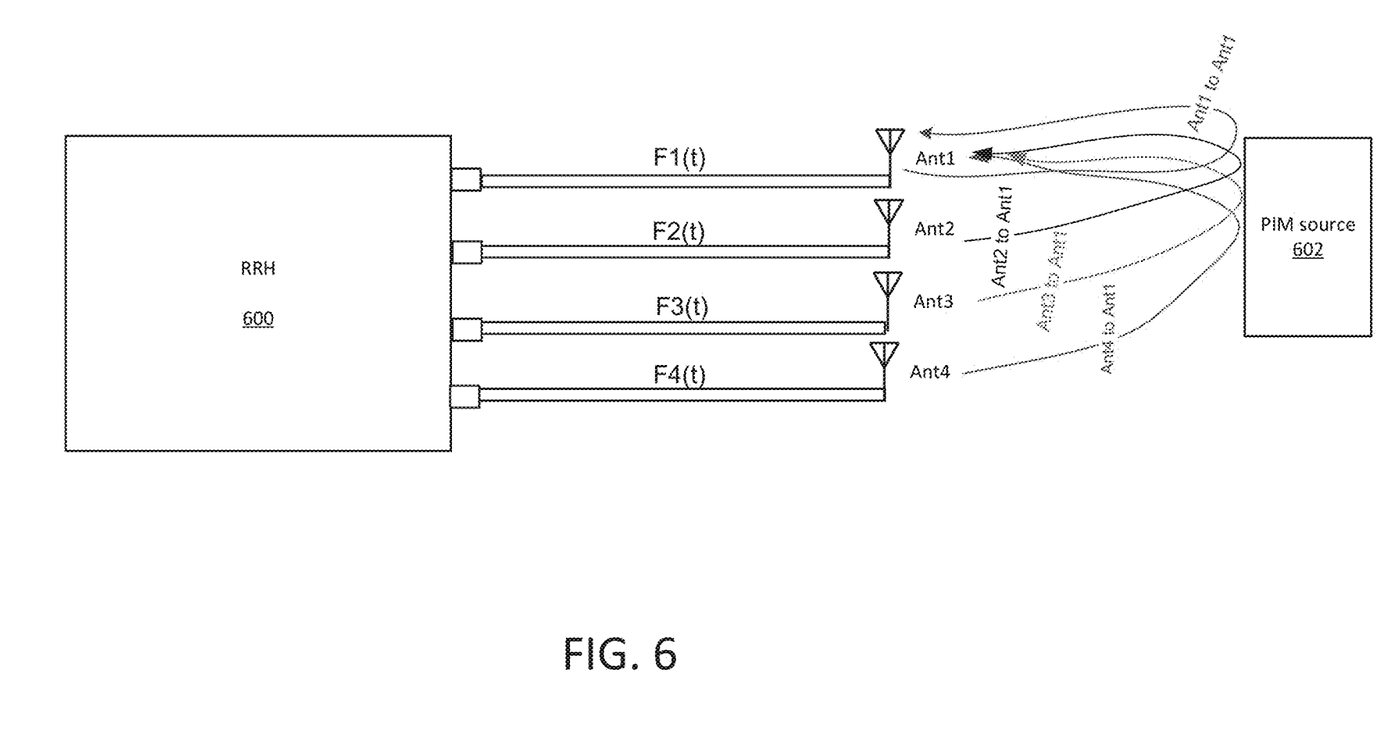
FIG. 6 illustrates a RRH and PIM source for explaining example embodiments.

Referring to FIG. 6, the RRH 600 includes a plurality of antennas Ant1, Ant2, Ant3 and Ant4. Although only four antennas are shown in FIG. 6, example embodiments should not be limited to this example. Rather, the RRH 600 may have any number of antennas.

As shown in the FIG. 6, antenna Ant1 may be affected by TX frequencies of any of Ant1 to Ant4, antenna Ant2 may be affected by TX frequencies of any of Ant1 to Ant4, antenna Ant3 may be affected by TX frequencies of any of Ant1 to Ant4, and so on. Accordingly, in at least this example embodiment, the RRH 600 generates a delay search basis function based on the impact discovery of each of antennas Ant1 to Ant4. For example purposes, however, Ant1 will be considered the RX antenna and antennas Ant2 to Ant4 will be considered TX antennas.

Referring collectively to FIGS. 5 and 6, S202 and S404 are the same as discussed above with regard to FIG. 4, and thus, a description of these steps will not be repeated here.

At S506, the RRH 600 applies the RX group delay model (RX direct model) $f_{model}$ to a decimated delay search basis function model_dec$_{Ant_n \text{ to } Ant_1}$ (where n=2, 3, 4 in this example) for each combination of antenna Ant1 and a respective one of antennas Ant2 to Ant4 to obtain a compensated delay search basis function model_comp$_{Ant_n \text{ to } Ant_1}$ for each combination. In one example, the compensated delay search basis function model_comp$_{Ant_n \text{ to } Ant_1}$ for the combination of antenna Ant1 and an n-th antenna (where n=2, 3, 4) may be determined via convolution as shown below in Equation 11.

$$\text{model\_comp}_{Ant_n \text{ to } Ant_1} = \text{model\_dec}_{Ant_n \text{ to } Ant_1} \otimes f_{model} \quad (11)$$

The decimated delay search basis function model_dec$_{Ant_n \text{ to } Ant_1}$ for the combination of antenna Ant1 and an n-th may be obtained based on a filtered search delay basis function model_flt$_{Ant_n \text{ to } Ant_1}$ for the respective combination in the same or substantially the same manner as discussed above with regard to FIG. 3. The RRH 600 may generate the filtered search delay basis function model_flt$_{Ant_n \text{ to } Ant_1}$ for the respective combination based on (e.g., by convolving) the delay search basis function model_n for the n-th antenna and decimation filter coefficients $f_{dec}$ in the same or substantially the same manner as discussed above with regard to FIG. 3.

Once having obtained the compensated delay search basis functions model_comp$_A$nt$_n$ to$_A$nt$_1$ for each antenna combination (Ant2 to Ant1, Ant3 to Ant1, Ant4 to Ant1), at S508 the RRH 600 iterates the delay search through all antenna transmissions to determine the maximum delay search magnitude among all of the antenna combinations. That is, for example, the RRH 600 determines the peak of the delay search d2(samples)$_{Ant_n \text{ to } Ant_1}$ as the index of the maximum correlation between the RX signal RX$_{Ant1}$ for antenna Ant1 and the compensated delay search basis function model_comp$_{Ant_n \text{ to } Ant_1}$ for each antenna combination as shown below in Equation 12.

$$d2(\text{samples})_{Ant_n \text{ to } Ant_1} = maxindex(\text{corr}(RX_{Ant_1}, \text{model\_comp}_{Ant_n \text{ to } Ant_1})) \quad (12)$$

The RRH 600 then obtains the second cancelation delay d2 (here denoted d2(s)$_{Ant_n \text{ to } Ant_1}$) based on the peak of the delay search d2(samples)$_{Ant_n \text{ to } Ant_1}$ and the model sampling frequency $f_s$ according to, for example, Equation 13 shown below.

$$d2(s)_{Ant_n \text{ to } Ant_1} = \frac{d2(\text{samples})_{Ant_n \text{ to } Ant_1}}{f_s} \quad (13)$$

Once having obtained the second cancelation delay d2, at S509 the RRH 600 computes the PIM source delay D3 based on the RX group delay D4, the first cancelation delay d1, the second cancelation delay d2, the RX delay D1 and the RX FPGA delay D2 according to Equation 1 discussed above. As with the example embodiment shown in FIG. 3, the first cancelation delay d1, the RX delay D1, and the RX FPGA delay D2 are known a priori at the RRH 100, and the RX group delay D4 may be determined and optimized based on the measured data average at the mid band of the RX group delay measured at S202.

Once having computed the PIM source delay D3, at S510 the RRH 600 computes the OTA distance-to-PIM Sar based on the computed PIM source delay D3. In more detail, for example, the RRH 600 determines the OTA PIM signal delay $D_{air}$ according to Equation 14 shown below.

$$D_{air} = D3 - D_{cable} \quad (14)$$

In Equation 14, $D_{cable}$ is the PIM signal delay in the antenna cable, which is given by $$S_{air} = D_{air} * c \quad (15)$$

where l is the approximate length of the antenna cable and V is the speed of light in the antenna cable. The approximate length l of the antenna cable may be input by a network operator and known at the RRH 600.

Once having obtained the OTA PIM signal delay $D_{air}$, the RRH 600 computes the OTA distance-to-PIM $S_{air}$ according to Equation (15) shown below, where c is again the speed of light.

$$D_{cable} = \frac{l}{V},$$

Although not shown in FIG. 5, a network operator may then utilize this distance-to-PIM S to, for example, identify the location of the PIM source and/or for troubleshooting PIM at the RRH 600.

Figure 7:
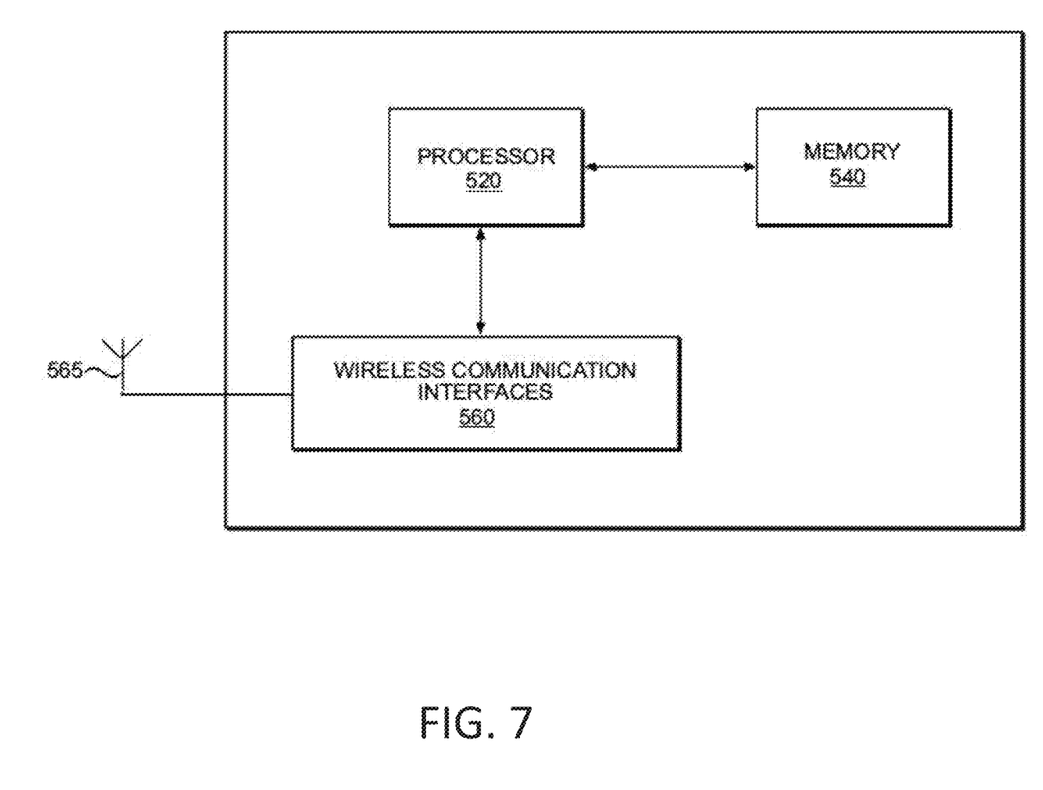
FIG. 7 is a block diagram illustrating an example embodiment of a RRH.

FIG. 7 illustrates an example embodiment of a RRH, such as RRH 100 and/or RRH 600. As shown, the RRH includes: a memory 540; a processor 520 connected to the memory 540; various interfaces 560 connected to the processor 520; and one or more (e.g., a plurality of) antennas or antenna panels 565 connected to the various interfaces 560. The various interfaces 560 and the antenna 565 may constitute a transceiver for transmitting/receiving data from/to other network elements (e.g., other UEs, gNBs, LMFs, TRPs, etc.) via one or more antenna beams. As will be appreciated, depending on the implementation of the RRH, the RRH may include many more components (e.g., FPGAs, etc.) than those shown in FIG. 7. However, it is not necessary that all of these generally conventional components be shown in order to disclose the illustrative example embodiment.

The memory 540 may be a computer readable storage medium that generally includes a random access memory (RAM), read only memory (ROM), and/or a permanent mass storage device, such as a disk drive. The memory 540 also stores an operating system and any other routines/modules/applications for providing the functionalities of the RRH to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 may be configured to carry out instructions of a computer program by performing the arithmetical, logical, and input/output operations of the system. Instructions may be provided to the processor 520 by the memory 540.

The various interfaces 560 may include components that interface the processor 520 with the antenna 565, or other input/output components. As will be understood, the various interfaces 560 and programs stored in the memory 540 to set forth the special purpose functionalities of the RRH will vary depending on the implementation of the RRH.

The interfaces 560 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing RRHs or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a RRH, network element or other network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, RRHs, or other network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

The invention claimed is:

1. A radio access network element comprising:
at least one processor; and
at least one memory storing instructions that, when executed by the at least one processor, cause the radio access network element to
compute a communication delay between the radio access network element and a source of passive intermodulation, based on receiver group delay information for the radio access network element in the bandwidth of the passive intermodulation, and
determine a distance between the source of passive intermodulation and the radio access network element based on the communication delay,
wherein the communication delay is an average receiver group delay in the bandwidth of the passive intermodulation.

2. The radio access network element of claim 1, wherein the distance is a distance from an antenna connector at the radio access network element to the source of passive intermodulation.

3. The radio access network element of claim 1, wherein the at least one memory stores instructions that, when executed by the at least one processor, cause the radio access network element to
 determine whether a portion of the passive intermodulation is outside a receive band at the radio access network element, and
 compute the average receiver group delay for the passive intermodulation within the receive band and the passive intermodulation within a threshold bandwidth outside the receive band.

4. The radio access network element of claim 3, wherein the threshold bandwidth is about 2 MHz.

5. The radio access network element of claim 1, wherein the at least one memory stores instructions that, when executed by the at least one processor, cause the radio access network element to
 obtain a cancelation delay based on a delay search signal transmitted by the radio access network element, and
 compute the communication delay based on the average receiver group delay and the cancelation delay.

6. The radio access network element of claim 1, wherein the receiver group delay information includes duplexer group delay for the radio access network element.

7. The radio access network element of claim 1, wherein the at least one memory stores instructions that, when executed by the at least one processor, cause the radio access network element to
 determine a receiver group delay inverse model based on the receiver group delay information,
 obtain an equalized signal by applying the receiver group delay inverse model to a signal received at the radio access network element, and
 compute the communication delay based on the equalized signal and the receiver group delay information.

8. The radio access network element of claim 7, wherein the at least one memory stores instructions that, when executed by the at least one processor, cause the radio access network element to
 obtain a cancelation delay at the radio access network element based on the equalized signal, and
 compute the communication delay based on the cancelation delay and the receiver group delay information.

9. The radio access network element of claim 7, wherein the at least one memory stores instructions that, when executed by the at least one processor, cause the radio access network element to perform a delay search based on the equalized signal to obtain the cancelation delay.

10. The radio access network element of claim 7, wherein the receiver group delay information is a fixed receiver group delay based on a receiver group delay measured at the radio access network element.

11. The radio access network element of claim 1, wherein the at least one memory stores instructions that, when executed by the at least one processor, cause the radio access network element to
 determine a receiver group delay model based on the receiver group delay information,
 obtain a compensated delay search basis function by applying the receiver group delay model to a delay search basis function for a transmitted signal resulting in the passive intermodulation, and
 compute the communication delay based on the compensated delay search basis function and the receiver group delay information.

12. The radio access network element of claim 11, wherein the at least one memory stores instructions that, when executed by the at least one processor, cause the radio access network element to
 obtain a cancelation delay at the radio access network element based on the compensated delay search basis function, and
 compute the communication delay based on the cancelation delay and the receiver group delay information.

13. The radio access network element of claim 11, wherein the receiver group delay information is a fixed receiver group delay based on a receiver group delay measured at the radio access network element.

14. The radio access network element of claim 1, wherein
 the communication delay is a combination of an over-the-air delay associated with the passive intermodulation and a cable transmission delay associated with the passive intermodulation, and
 the at least one memory stores instructions that, when executed by the at least one processor, cause the radio access network element to
 compute the cable transmission delay,
 compute the over-the air delay based on the communication delay and the cable transmission delay, and
 determine an over-the-air distance between the source of passive intermodulation and the radio access network element based on the over-the-air delay.

15. The radio access network element of claim 14, further comprising:
 a plurality of antennas, and wherein
 the at least one memory stores instructions that, when executed by the at least one processor, cause the radio access network element to
 iterate a delay search for transmissions from each of the plurality of antennas to determine a maximum delay search magnitude,
 obtain a cancelation delay at the radio access network element based on the maximum delay search magnitude, and
 compute the communication delay based on the cancelation delay and the receiver group delay information.

16. A method for locating a source of passive intermodulation at a radio access network element, the method comprising:
 computing a communication delay between the radio access network element and the source of passive intermodulation, based on receiver group delay information for the radio access network element in the bandwidth of the passive intermodulation; and
 determining a distance between the source of passive intermodulation and the radio access network element based on the communication delay,
 wherein the communication delay is a combination of an over-the-air delay associated with the passive intermodulation and a cable transmission delay associated with the passive intermodulation, and
 the method further includes
 computing the cable transmission delay,
 computing the over-the air delay based on the communication delay and the cable transmission delay, and
 determining an over-the-air distance between the source of passive intermodulation and the radio access network element based on the over-the-air delay.

17. The method of claim 16, wherein
radio access network element includes a plurality of antennas, and
the method further includes
iterating a delay search for transmissions from each of the plurality of antennas to determine a maximum delay search magnitude,
obtaining a cancelation delay at the radio access network element based on the maximum delay search magnitude, and
computing the communication delay based on the cancelation delay and the receiver group delay information.

18. A non-transitory computer-readable storage medium storing instructions that, when executed by at least one processor at a radio access network element, cause the radio access network element to perform a method for locating a source of passive intermodulation at the radio access network element, the method comprising:

computing a communication delay between the radio access network element and the source of passive intermodulation, based on receiver group delay information for the radio access network element in the bandwidth of the passive intermodulation; and
determining a distance between the source of passive intermodulation and the radio access network element based on the communication delay,
wherein the communication delay is a combination of an over-the-air delay associated with the passive intermodulation and a cable transmission delay associated with the passive intermodulation, and
the method further includes
computing the cable transmission delay,
computing the over-the air delay based on the communication delay and the cable transmission delay, and
determining an over-the-air distance between the source of passive intermodulation and the radio access network element based on the over-the-air delay.

* * * * *